(12) United States Patent
Check

(10) Patent No.: US 6,973,552 B2
(45) Date of Patent: Dec. 6, 2005

(54) SYSTEM AND METHOD TO HANDLE PAGE VALIDATION WITH OUT-OF-ORDER FETCH

(75) Inventor: Mark A. Check, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 10/435,869

(22) Filed: May 12, 2003

(65) Prior Publication Data

US 2004/0230755 A1    Nov. 18, 2004

(51) Int. Cl.⁷ ............................................. G06F 12/00
(52) U.S. Cl. ..................... 711/158; 712/228; 712/218; 714/11
(58) Field of Search ................................ 711/168, 127; 712/244, 201

(56) References Cited

U.S. PATENT DOCUMENTS

| | | | |
|---|---|---|---|
| 4,189,768 A | | 2/1980 | Liptay et al. ............... 364/200 |
| 4,901,233 A | * | 2/1990 | Liptay ......................... 712/218 |
| 5,185,871 A | | 2/1993 | Frey et al. ................... 395/375 |
| 5,418,916 A | * | 5/1995 | Hall et al. ................... 712/228 |
| 5,504,859 A | * | 4/1996 | Gustafson et al. ............. 714/11 |
| 5,511,175 A | | 4/1996 | Favor et al. ................. 395/375 |
| 5,913,923 A | * | 6/1999 | Dunlap et al. ............... 710/100 |
| 6,269,426 B1 | * | 7/2001 | Hetherington et al. ....... 711/140 |

* cited by examiner

Primary Examiner—Kevin L. Ellis
Assistant Examiner—Duc T Doan
(74) Attorney, Agent, or Firm—Cantor Colburn LLP; Lynn Augspurger

(57) ABSTRACT

A system and method to detect when a page access exception occurs on a subsequent part of a long operand processed out of order before the page is asynchronously marked valid by the operating system where the first request of the operand when later processed out of order after a subsequent buffer found no exception. In this case the instruction that encountered this situation is aborted and is re-executed with no page access exceptions. This prevents reporting improper delayed access exceptions on the operand data.

21 Claims, 3 Drawing Sheets

| | VALID 210 | FIRST 220 | DATA VALID 230 | REQUEST DONE 240 | DATA LOST 250 | EXCEPTION SUM 260 |
|---|---|---|---|---|---|---|
| X-1 | | | | | | |
| X | | | | | | |
| X+1 | | | | | | |

SYSTEM AND METHOD TO HANDLE PAGE VALIDATION WITH OUT-OF-ORDER FETCH

FIELD OF THE INVENTION

This invention relates to processing of exceptions with out-of-order operand fetch and storage page validation. The invention particularly is directed to receiving and processing exceptions that will only exist on part of the operand as storage pages get asynchronously marked valid on a processor that supports out-of-order operand fetch to prevent reporting improper delayed access exceptions (DAE)on the operand data.

RELATED APPLICATIONS

This application is related to U.S. patent application entitled "System and Method to Handle Operand Re-Fetch After invalidation with Out-Of-Order Fetch", Ser. No. 10/435,879, filed contemporaneously with this application.

The description set forth in this co-pending application is hereby incorporated into the present application by this reference. This co-pending application and the present application are owned by one and the same assignee, International Business Machines Corporation of Armonk, N.Y.

Trademarks: IBM® is a registered trademark of International Business Machines Corporation, Armonk, N.Y., U.S.A. S/390, Z900 and z990 and other product names may be registered trademarks or product names of International Business Machines Corporation or other companies.

BACKGROUND

In most modern large computer systems the memory system is a virtual memory structure. In these systems, the total memory defined is often much larger than the amount of real memory in the system. In this situation, only part of the defined memory will be resident in real memory at any one time. When a program that is executing makes a storage request to a page that is not currently resident in the real memory a page access exception is reported to the operating system. The operating system then allocates a page in real memory for the page the program desires to access. The operating system running on the IBM® Z/Architecture as defined in z/Architecture Principles of Operation, Publication No. SA22-7832-00, December 2000, is allowed to allocate a page in real memory and mark it valid at any time without taking any special action.

The architecture does require special actions when a page is being removed from real memory storage and will no longer be available. When the computer system is a multi-processor system there may be multiple programs executing simultaneously and requesting the same page of storage at slightly different times. In this case, a microprocessor with out-of-order fetch may process a subsequent fetch before the first fetch for a given operand. However, it is contemplated that the architecture of future processors include in order execution that will support out-of-order operand fetch.

Thus, a system and method is desired that allows a processor to be configured to support out-of-order operand fetching with in-order execution of instructions.

SUMMARY OF THE INVENTION

In accordance with an exemplary embodiment of the invention a system and method to detect exceptions caused by out-of-order fetching and preventing incorrect delayed access exceptions is disclosed. When a subsequent doubleword of an operand receives an access exception while the first doubleword of the operand does not receive an access exception because the operating system allocated real memory and marked the page of interest valid, the instruction is tried again. First, the system and method detect whether a doubleword of data after the first doubleword has such an exception. As a result of detecting an exception, the current instruction is delayed from execution while a detailed examination is conducted to see if this exception condition is for this instruction or a subsequent instruction in the operand buffers. This evaluation takes three pipeline cycles. If the exception condition exists for the current instruction at the end of the evaluation time, then this instruction execution will be aborted and will attempted again. During re-execution or second execution of the instruction, the page will be already valid and all parts of the operand will not receive a page access exception and execution of the instruction should proceed without the existence of the delayed access exception.

These and other improvements are set forth in the following detailed description. For a better understanding of the invention with advantages and features, refer to the description and to the drawings.

DESCRIPTION OF THE DRAWINGS

FIG. 2 illustrates information kept in the operand buffers to support detection of out-of-order operand fetching and operand refecth.

The detailed description explains the preferred embodiments of the invention, together with advantages and features, by way of example with reference to the drawings.

DETAILED DESCRIPTION OF THE INVENTION

The invention particularly is directed to receiving and processing exceptions that only exist on part of the operand as storage pages get asynchronously marked valid on a processor that supports out-of-order operand fetch to prevent reporting improper delayed access exceptions.

Figure 1:
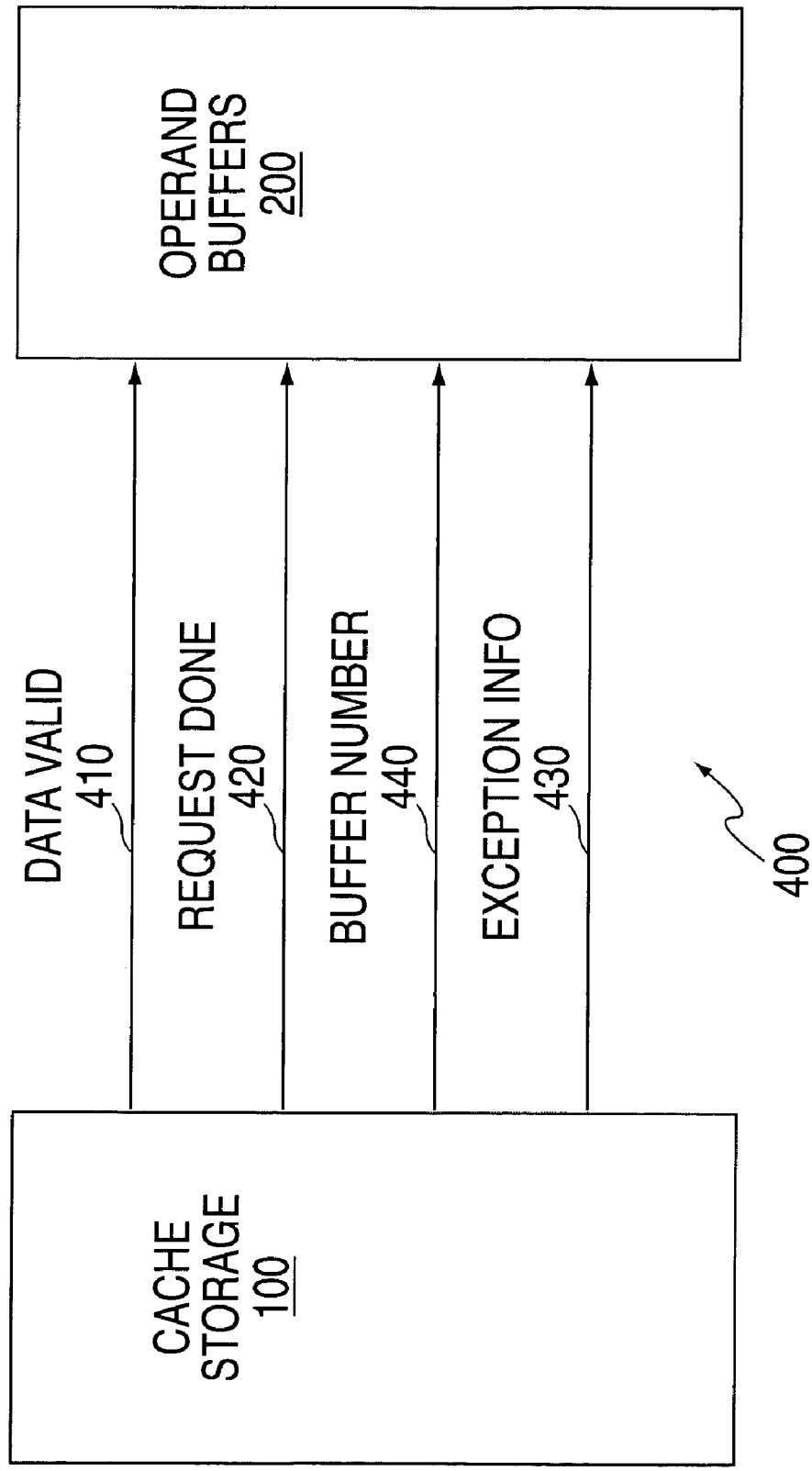
FIG. 1 illustrates operable connections between a cache storage and operand buffers.

Referring to FIG. 1, a cache storage 100 illustrates operable communication with operand buffers 200 via operand fetch logic information therebetween shown generally at 400. The operand fetch logic information includes data valid 410, request done 420, exception information 430, and buffer number 440.

When operand buffers 200 are assigned for an operand referring now to FIGS. 1 and 2, each buffer is marked valid 210 in the operand buffer logic depicted generally at 206. FIG. 2 illustrates buffers X−1, X, and X+1 and information kept for each buffer in the columns of operand buffer logic 206 for each buffer. The first buffer, i.e., buffer X, of each operand is marked as "first" 220 in the operand buffer logic as well. When cache 100 returns data to the operand buffers 200, cache 100 indicates when the request is done 420 and if there was valid data 410. The cache 100 also indicates whether there was a page access exception 430 for this completed request via the operand fetch logic indicated generally at 400 in FIG. 1.

When a page access exception exists, cache 100 indicates that the request is done 420, indicates no valid data 410, and indicates that the request had a page access exception 430. The buffer, in turn, marks buffer X as request done 240 with exception summary information 260 and no valid data in valid data 230. The buffer also marks buffer X as data lost 250. For all buffers the operand buffer logic maintains a summary of all buffers, which indicates a possible delayed access exception (DAE). Operand buffer logic indicating a DAE, for example, may indicate that the buffer is valid 210, not the first 220 buffer of an operand, has data lost 240, and that a page access exception exists 260.

Figure 3:
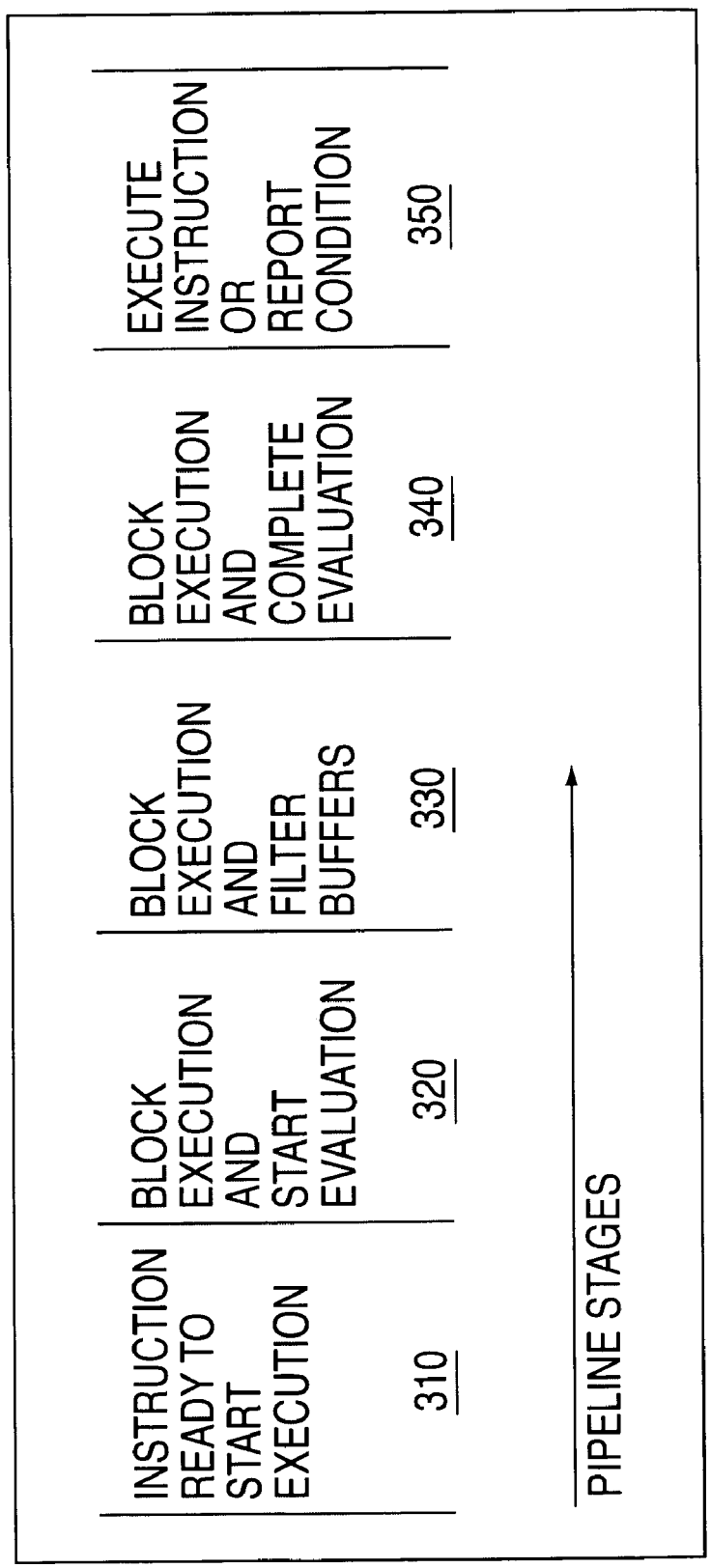
FIG. 3 illustrates pipeline stages for detection of out-of-order operand fetching and operand re-fetch.

Referring now to FIGS. 2 and 3, in order for an instruction to be ready to execute at block 310 of an exemplary pipeline stage shown generally at 300, the first buffer (i.e., buffer X) for each operand of the instruction must be ready. For the first buffers to be ready to execute, they must be valid 210, have data valid 230, and request done 240. The buffer must also not indicate data lost 250 and any exception 260. Otherwise the instruction will not be executed, but rather, the exception condition will be processed.

In the case where a subsequent buffer was returned with a page access exception and the first buffer was returned after the page was validated with no page access exception, the first buffer will be ready to start execution but the summary that a possible delayed access exception exists may be indicated when exception summary 260 indicates a presence of an exception for that buffer. If the instruction that is about to start execution at block 310 has an operand that has more than one operand buffer this condition is checked.

If more than one buffer exists for the instruction, the instruction is blocked from execution at block 320 and a three cycle evaluation is started. In the first of these evaluation cycles at block 320 the start of the three cycle evaluation is signaled. In the second cycle of the evaluation at block 330, all of the subsequent buffers not for this operand that have data lost 250 and exception summary 260 are reported. In the third cycle at block 340, an operand buffer past the first operand buffer is checked to determine whether this past operand had a buffer past the first buffer that received a page access exception where the first buffer did not. In the cycle after the third evaluation cycle at block 350, if the condition of the possible delayed access exception was not for this instruction, the instruction execution continues as normal. If it was for this instruction, then the condition is reported and the instruction execution is aborted and is tried again.

The above described exemplary embodiment discloses a system and method for a contemplated zSeries system where the processor is configured to support out-of-order operand fetching with in-order execution of instructions. All operand fetches in the processor will return data and exception information to the operand buffers which will keep track of the information for each operand. In this architecture, instructions can have one or two operands that are longer than the basic cache access size. Only instructions with long operands(e.g., longer than a single doubleword)experience the situation described above.

In summary, in an out-of-order operand fetch a doubleword (an eight byte piece of storage) after a first doubleword of the operand may be attempted to be fetched out of program order and get a page access exception before the first doubleword of the operand can return. Once the processor initiates execution of an instruction, the instruction can not be aborted except by a recovery action, in which case if this occurs too often, will not produce acceptable performance. It is important to note that once an instruction with long operands has started execution that it can not and should not be killed or aborted.

The above described system and method keeps information about the results of the data return and exception return for all fetches. At the start of each instruction having long operands, i.e., longer than eight bytes, the system and method include checking the first fetch return to see if it has an exception and all subsequent fetches to see if any of the subsequent fetches return with exception reports without data. If the first fetch is absent an exception and a subsequent fetch indicates an exception, the operating system may have made a page valid where the subsequent fetch was processed before the first fetch of the operand. In conventional processors, however, when fetches would be done in order and a subsequent fetch of an operand would receive an exception when the first fetch is valid and not receive an exception, this situation would be considered a delayed access exception (DAE) and report the same. The above disclosed system and method provide a means to re-fetch an instruction before improperly reporting a DAE. The system and method provide for suspending the current instruction and re-trying the instruction before killing the software because the out-of-order fetch detected the operating system marking pages valid.

In summary, the system and method provide for fetch information to be maintained including information indicative of whether valid data was returned and whether there are any exceptions. Information is also retained about the instruction type and information indicative of the first fetch for the operand. During each cycle, fetch data returned from the cache is reviewed to determine any exceptions with no data (i.e., page not valid). When an instruction is started and the instruction type indicates a long operand (i.e., more than eight bytes) the system and method check the first fetch to determine if the first fetch has any exceptions. If the first fetch does not indicate any exceptions, the subsequent fetches are checked to determine if any of the subsequent fetches indicative of no data with exception are for the current instruction being started, if not, the instruction is allowed to proceed to execution. If the subsequent fetches after the first fetch are for the current instruction and indicate any exceptions, then signal an exception type that causes the instruction to be temporarily halted and the instruction retried again before signaling a DAE. A latch is preferably set to indicate that this has occurred. If it is the case that the processor was detecting the operating system marking a page valid, then this will not happen a second time as the latch is set to ensure the same. However, if the same thing occurs again before the reattempted instruction is successful, then signal a proper DAE. In this manner, an improper DAE is not reported without re-fetching the instruction first.

In other words, the processor checks for exceptions for an operand with the first doubleword of each operand. If a subsequent doubleword of the operand gets an access exception before the first doubleword can return where the operating system brought the page into real memory and marks it valid because of a request from another program, the first doubleword may return with no exception which would be considered to be a Delayed Access Exception (DAE). It is not proper to report a DAE on the program due to the processor accessing the data out of order. Since there are required protections for when a page is removed from the real storage it is not possible to have the sequence happen again without proper invalidation sequences. Thus, before the instruction can start execution this condition (i.e., DAE) must be checked for and if it exists, the instruction execution must be aborted and the instruction re-executed. In the re-execution or second execution of the same, a detection of the page access exception will not result again.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system configured to detect and properly handle out of order access exceptions with asynchronous page validation in a multiprocessor system comprising:
    a processor configured to execute instructions from an executing program in program order;
    a cache storage;
    operand buffers in operable communication with the cache storage and the processor; and
    detection logic configured to detect out of order access exceptions for instructions having long operands, and re-fetch the instruction having the long operands before delaying execution of the instruction having the long operands when the out of order access exception for the long operands is detected, wherein long operands fetches access an amount of data more than eight bytes of data.

2. The system as in claim 1, wherein the execution of the instruction having long operands is delayed until an evaluation of only the buffers for the instruction is completed.

3. The system as in claim 1, wherein the processor suspends execution of the instruction having long operands when a buffer for an operand after a first buffer has an access exception and the first buffer of the operand does not cause the instruction to be canceled and re-executed.

4. The system as in claim 1, wherein the processor suspends execution of the instruction having long operands where a buffer for an operand after a first buffer of the operand is for a future instruction and execution of the current instruction is resumed after an evaluation period.

5. The system as in claim 1, wherein the processor prevents the executing program from receiving a false report of a delayed access exception when the processor fetches operand data out of program order and receives access exceptions on a portion fetched out of order.

6. The system as in claim 1, wherein the processor includes out-of-order operand fetching that is configured to provide correct program execution when an operating system allocates a page to real memory and marks it valid due to a request from another processor during a time that the same page is being fetched on the current processor where data past the start of the long operand is returned from the cache storage with a page access exception prior to a first data of the long operand without a page access exception.

7. The system as in claim 2, wherein the evaluation includes:
    signaling initiation of the evaluation;
    reporting all subsequent buffers having page access exceptions not for the current instruction;
    determining whether a buffer past a first buffer of the long operand received a page access exception when the first buffer did not;
    continuing instruction execution if all of the reported page access exceptions are not for the current instruction; and
    aborting instruction execution if any of the reported page access exceptions are for the current instruction.

8. The system as in claim 7, wherein the evaluation has an evaluation period of three cycles.

9. The system as in claim 7, wherein the aborting instruction execution includes reporting the aborting to the processor.

10. A method to detect and properly handle out-of-order access exceptions with asynchronous page validation in a processor in a multiprocessor system, the method comprising:
    fetching instructions from a cache storage to operand buffers;
    executing instructions from an executing program in program order; and
    detecting out-of-order access exceptions using detection logic configured to detect out of order access exceptions for instructions having long operands and re-fetch the instruction having long operands before delaying execution of the instruction having long operands when the out of order access exception for the long operands is detected, wherein long operands fetches access an amount of data more than eight bytes of data.

11. The method as in claim 10, wherein the execution of the instruction having long operands is delayed until a detailed evaluation of only the buffers for the instruction is completed.

12. The method as in claim 10, wherein the processor suspends execution of the instruction having long operands when a buffer for an operand after a first buffer has an access exception and the first buffer of the operand does not cause the instruction to be canceled and re-executed.

13. The method as in claim 10, wherein the processor suspends execution of the instruction having long operands where a buffer for an operand after a first buffer of the operand is for a future instruction and execution of the current instruction is resumed after an evaluation period.

14. The method as in claim 10, wherein the processor prevents the executing program from receiving a false report of a delayed access exception when the processor fetches operand data out of program order and receives access exceptions on a portion fetched out of order.

15. The method as in claim 10, wherein the processor includes out-of-order operand fetching that is configured to provide correct program execution when an operating system allocates a page to real memory and marks it valid due to a request from another processor during a time that the same page is being fetched on the current processor where data past the start of the long operand is returned from the cache storage with a page access exception prior to a first data of the long operand without a page access exception.

16. The method as in claim 11, wherein the evaluation includes:
    signaling initiation of the evaluation;
    reporting all subsequent buffers having page access exceptions not for the current instruction;
    determining whether a buffer past a first buffer of the long operand received a page access exception when the first buffer did not;
    continuing instruction execution if all of the reported page access exceptions are not for the current instruction; and
    aborting instruction execution if any of the reported page access exceptions are for the current instruction.

17. The method as in claim 16, wherein the evaluation has an evaluation period of three cycles.

18. The method as in claim 16, wherein the aborting instruction execution includes reporting the aborting to the processor.

19. A storage medium encoded with machine-readable computer code for verifying a hardware design of a system under evaluation via a test program executing on a computer, said storage medium including instructions for causing said computer to implement a method, comprising:
- fetching instructions from a cache storage to operand buffers;
- executing instructions from an executing program in program order; and
- detecting out-of-order access exceptions using detection logic configured to detect out of order access exceptions for instructions having long operands and re-fetch the instruction having long operands before delaying execution of the instruction having long operands when the out of order access exception for the long operands is detected, wherein each of the long operands fetches an amount of data more than eight bytes of data.

20. The storage medium as in claim 19, wherein the execution of the instruction having long operand is delayed until a detailed evaluated of only buffers for the instruction is completed.

21. The storage medium as in claim 20, wherein the evaluation includes:
- signaling initiation of the evaluation;
- reporting all subsequent buffers having page access exceptions not for the current instruction;
- determining whether a buffer past a first buffer of the long operand received a page access exception when the first buffer did not;
- continuing instruction execution if all of the reported page access exceptions are not for the current instruction; and
- aborting instruction execution if any of the reported page access exceptions are for the current instruction.

* * * * *